Aug. 13, 1963 W. R. CROOKS 3,100,478
FUEL CONTROL SYSTEM FOR INTERNAL COMBUSTION ENGINES
Filed Oct. 27, 1961 5 Sheets-Sheet 1
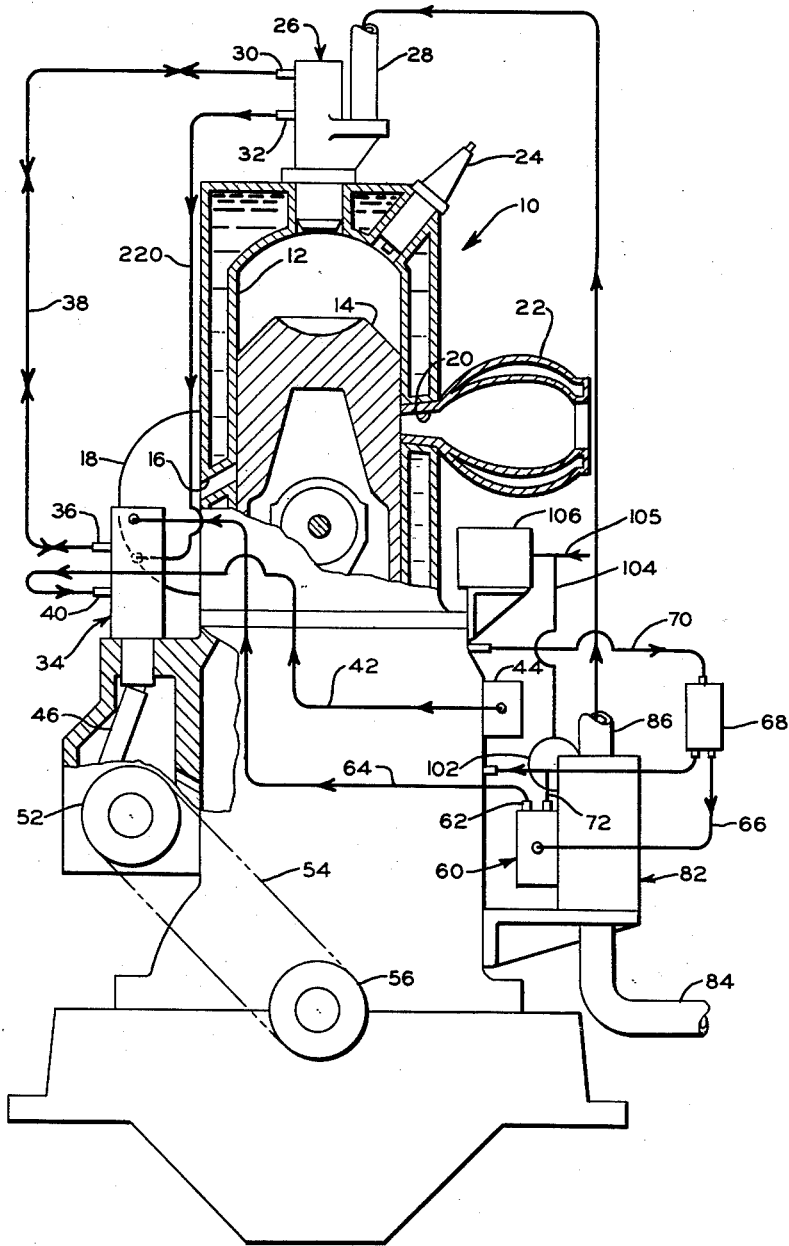
*Fig. I.*
INVENTOR.
WILLIAM R. CROOKS
BY
Owen & Owen
ATTORNEYS

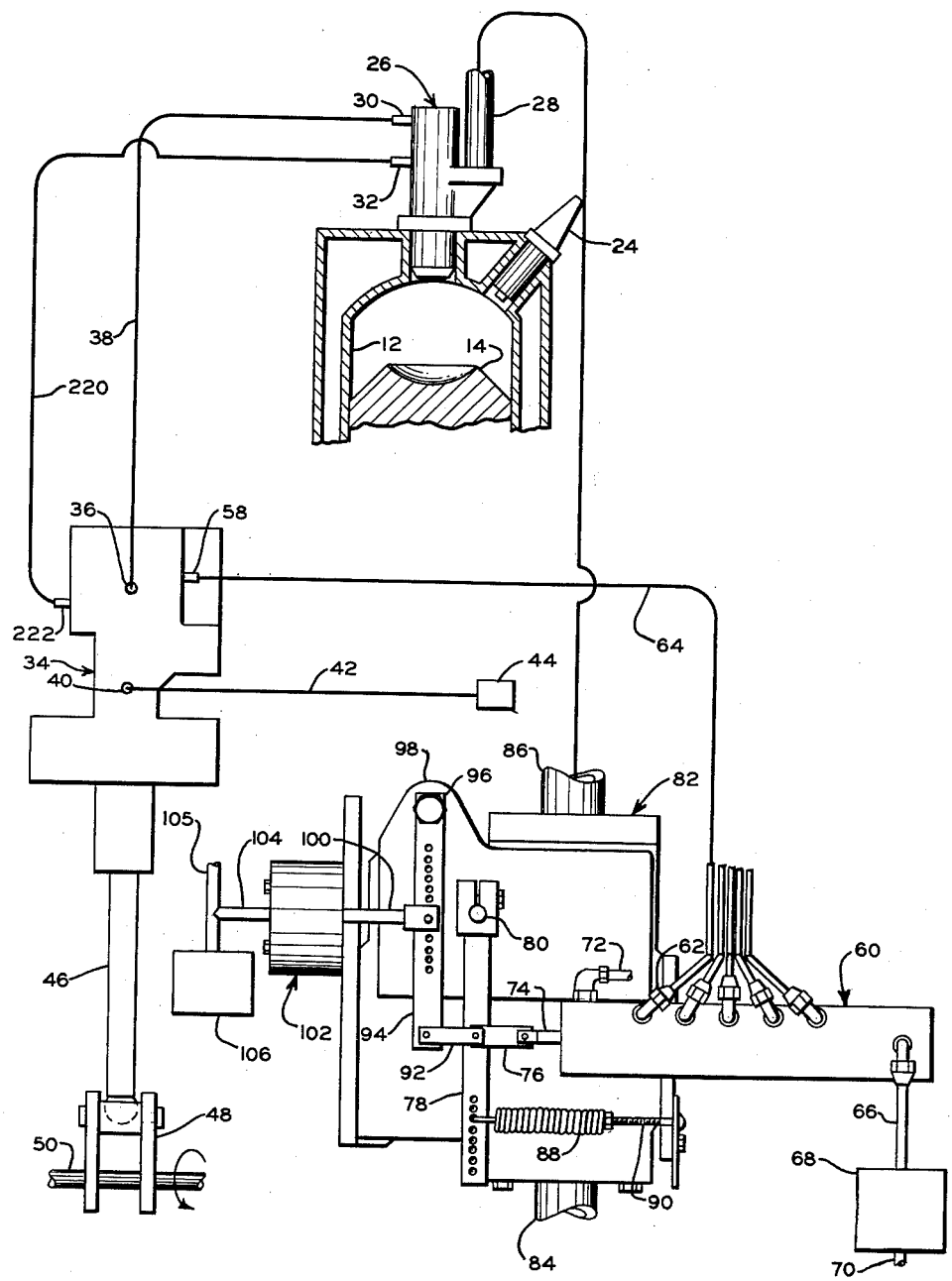

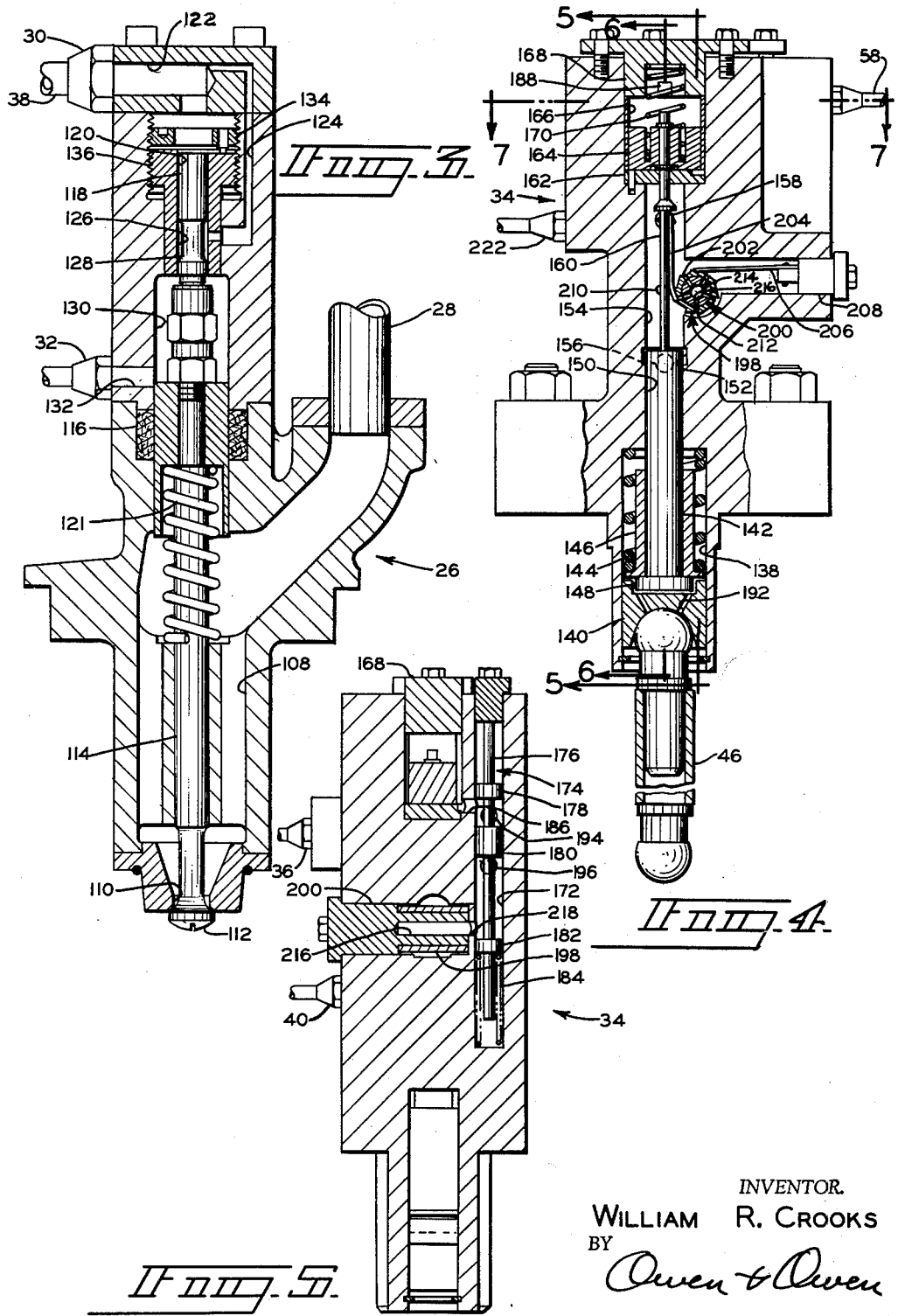

Aug. 13, 1963  W. R. CROOKS  3,100,478
FUEL CONTROL SYSTEM FOR INTERNAL COMBUSTION ENGINES
Filed Oct. 27, 1961  5 Sheets-Sheet 4

INVENTOR.
WILLIAM R. CROOKS
BY Owen + Owen
ATTORNEYS

Aug. 13, 1963 W. R. CROOKS 3,100,478
FUEL CONTROL SYSTEM FOR INTERNAL COMBUSTION ENGINES
Filed Oct. 27, 1961 5 Sheets-Sheet 5
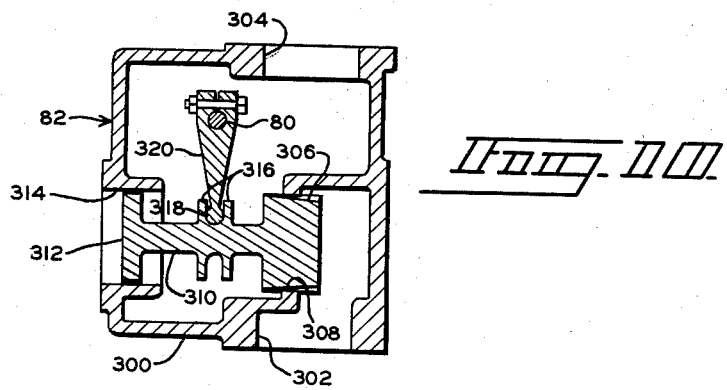
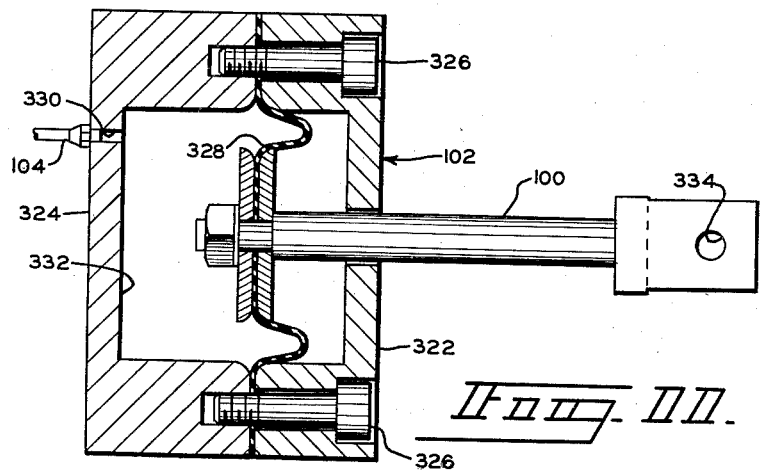
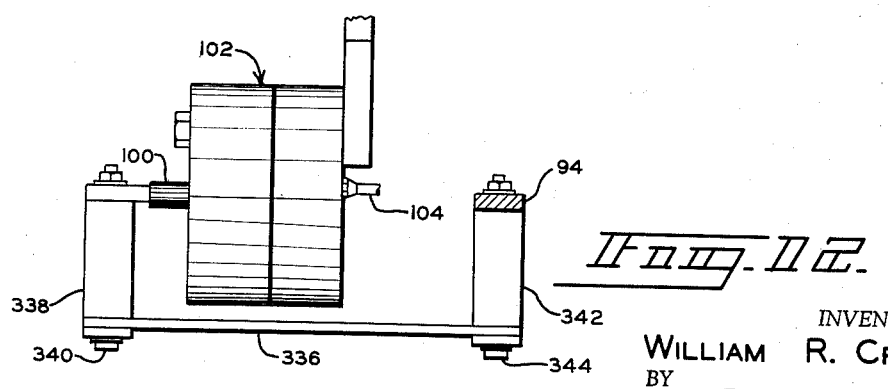
INVENTOR.
WILLIAM R. CROOKS
BY
*Owen & Owen*
ATTORNEYS

United States Patent Office 3,100,478
Patented Aug. 13, 1963

3,100,478
FUEL CONTROL SYSTEM FOR INTERNAL COMBUSTION ENGINES
William R. Crooks, Mount Vernon, Ohio, assignor to The Cooper-Bessemer Corporation, Mount Vernon, Ohio, a corporation of Ohio
Filed Oct. 27, 1961, Ser. No. 148,187
10 Claims. (Cl. 123—21)

This invention relates to a fuel control system for an internal combustion engine and more particularly to a system for reducing fuel consumption in an engine utilizing gaseous fuel, when the engine is operating at less than full load.

Fuel consumption in a two-cycle gas engine can be decreased by decreasing the quantity of fuel supplied to its cylinders during relatively light loads only to a certain point. Engines using gaseous fuel operate with a somewhat critical air-fuel ratio so that as the mixture becomes more lean with an attempt to reduce the gas the engine load decreases the critical ratio is soon passed and further reduction in fuel results in a mixture which fires uncertainly. This point is usually reached at about half-load. Attempts to supply a mixture that is more lean results in a waste of the fuel because if the mixture does not fire the unburned fuel is exhausted without accomplishing any work. This is caused by an excess of combustion air being trapped in the cylinder during each cycle in proportion to the amount of fuel required for the reduced load. Sporadic firing is particularly objectionable in engines driving generators because a disturbance results in the electrical system. Although thhe intake air can be throttled to alleviate this condition to some extent, nevertheless, efficient combustion is not attained at light loads when the quantity of fuel is decreased to any great extent in most engines.

Consequently, conventional gaseous fuel engines frequently have a no-load fuel consumption rate that is approximately half the full-load fuel consumption rate and also have a higher than ideal rate of fuel consumption up to full load conditions, because of the inability to regulate the quantity of fuel in proportion to the load. Thus, at any load below full load, both fuel consumption and operating costs are higher than necessary.

The present invention relates to a fuel control system for an engine, which system substantially reduces fuel consumption at less than full load conditions and results in substantially reduced operating costs. The new control system according to the invention is responsive to rate of fuel flow, or fuel consumption, which varies with engine load, and can also be responsive to engine speed, as will be more fully apparent subsequently.

The system according to the invention is particularly useful for spark-ignited gas engines having a high compression ratio and operating on a two-stroke cycle. When the engine is operating at full load, all cylinders function in a conventional manner with firing occurring upon the beginning of every down stroke. As the load decreases, the control system of the present invention causes one of the cylinders to fire upon every other down stroke to produce an alternate firing operation which is hereafter referred to as a "four-cycle" operation, even though the term is not used in its generally accepted sense. Upon further decrease in load, a second cylinder is caused to fire similarly in an alternate manner, and upon further load reduction, the third and, subsequently, the remaining cylinders are sequentially caused to operate in the same manner.

Tests have shown that when a conventional gaseous fuel engine having a no-load consumption rate of 50% of that of full load was equipped with a control system according to the invention, fuel consumption under no-load conditions was reduced to only about 25% of the full load rate.

It is, therefore, a principal object of the invention to provide a fuel control system which greatly increases the efficiency of an internal combustion engine in terms of fuel consumption.

A further object of the invention is to provide a fuel control system which reduces fuel consumption and operating costs of an internal combustion engine when operating at less than full load conditions.

Still another object of the invention is to provide a fuel control system which reduces the firing frequency of one or more cylinders of an engine when it is operating at less than full load conditions.

Other objects and advantages of the invention will be apparent from the following detailed description of a preferred embodiment thereof, reference being made to the accompanying drawing, in which:

FIG. 1 is an over-all, schematic view of a gas engine utilizing a control system according to the invention, with parts of the engine broken away and with parts in cross section;

FIG. 2 is a schematic view of a portion of the engine and the over-all control system shown in FIG. 1 with parts thereof shown in cross section;

FIG. 3 is a detailed view in cross section of a fuel valve shown in FIGS. 1 and 2;

FIG. 4 is a detailed view in vertical cross section of a control valve for the fuel valve, the control valve also being shown in FIGS. 1 and 2;

FIG. 5 is a view in cross section taken along the line 5—5 of FIG. 4;

FIG. 10 is a detailed view in vertical cross section of a load sensing device shown in FIGS. 1 and 2;

FIG. 11 is a greatly enlarged, detailed view in cross section of a speed-sensing device shown in FIGS. 1 and 2; and FIG. 12 is an enlarged, top view of a modified speed-sensing device.

Figure 7:
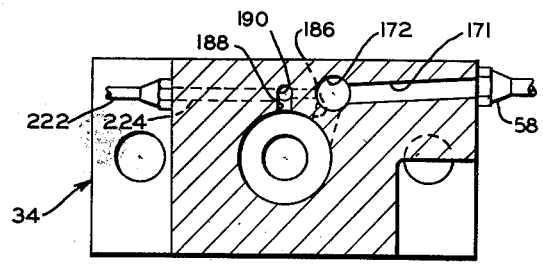
FIG. 7 is a view in cross section taken along the line 7—7 of FIG. 5.

While the control system according to the present invention is shown in combination with a two-cycle, five-cylinder gas engine, it is to be understood that the system can be employed with other types of engines and with engines having more or less than five cylinders.

Referring to the drawings, and more particularly to FIG. 1, a two-cycle gas fueled engine is indicated at 10 in outline form, with parts broken away and parts in cross section. For purposes of description it will be assumed that the engine 10 includes five two-cycle cylinders 12, each containing a piston 14. Each of the cylinders 12 also includes an intake port 16 communicating with a scavenging air manifold 18, and an exhaust port 20 communicating with an exhaust manifold 22. A spark plug 24 is located in the cylinder head to ignite gas injected into the cylinder 12.

The various components of the fuel control system according to the invention as shown in FIG. 1 will now be briefly discussed individually and the relationship of and the connections between the components will be described. Subsequently, the individual components will be discussed in detail. The first principal component is a fuel valve 26 mounted in the cylinder head to inject fuel at the desired time into the cylinder 12 above the piston 14. The fuel valve 26 is an oil-pressure operated device and opens to admit fuel into the cylinder 12 from a fuel supply line 28 each time oil pressure is applied to the valve 26 through an inlet 30, part of this oil being drained through an outlet 32. The fuel valve 26 thus operates to supply gas to its associated cylinder whenever a pulse of oil pressure is applied to it.

Oil pressure for the fuel valve 26 is controlled by a pressure control valve 34, the second principal component, which supplies oil under pressure to the fuel valve 26 through a control line 38. Each time the valve 34 supplies this oil, the fuel valve 26 supplies fuel to the cylinder 12 and causes it to fire. The oil for the operation of the fuel valve 26 is supplied to an oil supply inlet 40 of the control valve 34 through a line 42 from an oil manifold 44 associated with the engine 10.

The pressure control valve 34 is operated by a push rod 46 which is pivotally attached to an offset portion or cam 48 (FIG. 2) mounted on a shaft 50. There are, of course, five of the offsets or cams 48 on the shaft 50 to operate five of the push rods 46 for the five control valves 34, each associated with one of the five cylinders 14. The shaft 50 is rotated through a driven sprocket or gear 52 (FIG. 1), a chain 54 and a drive sprocket or gear 56 mounted on the engine crankshaft. With this arrangement, movement of the push rod 46 is synchronized with the rotation of the crankshaft and, hence, the pistons 14, as is well known in the art.

Under normal operation, the push rod 46 reciprocates once during each cycle of its associated piston 14 and, at full load, causes the control valve 34 to supply oil under pressure through the line 38 to the gas valve 26 once during each cycle of the piston. The gas valve 26 then opens to supply gas from the line 28 to the cylinder 12 once during each cycle in the usual manner. However, if control oil under pressure is supplied to the control valve 34 through an inlet 58, the control valve will not supply oil under pressure through the line 38 to the gas valve 26 upon each reciprocatory movement of the push rod 46, as will be explained later in detail, with the result that the gas valve 26 will not open every cycle. Rather, in the preferred form, the control valve 34 operates to supply oil through the line 38 to the control valve 26 upon every other cycle to produce alternate firing of the particular cylinder 12 of the engine. This occurs as long as the control valve 34 receives oil under pressure through the inlet 58.

Oil to the control inlet 58 of the control valve 34 is, in turn, regulated by means of a cylinder selector valve 60, the third principal component, which communicates with the inlet 58 through an outlet 62 and a control line 64. This oil is supplied to the cylinder selector valve 60 through an inlet line 66 from an oil pressure booster and regulator device 68 connected by a line 70 to a source of oil within the engine 10. The cylinder selector valve 60 also has a drain line 72 which discharges to the engine base along with a line from the booster and regulator device 68.

The number of the control valves 34 to which oil is supplied through the lines 64 by the selector valve 60 is determined by the position of a selector valve rod 74 (FIG. 2), as will be apparent subsequently. The rod 74 is connected by a link 76 to a main operating lever 78 which is affixed to a shaft 80 of a load sensor 82, a fourth principal component of the fuel control system.

Fuel to all five of the cylinders 12 is delivered from a supply line 84 and connecting lines 86 through the load sensor 82. The larger the volume of fuel flowing through the sensor 82, the more the operating lever 78 will move toward the left, in a clockwise direction, and the more the selector valve arm 74 will be moved toward the left. The details of the sensor 82 will be discussed more fully subsequently.

Movement of the operating lever 78 in a clockwise direction is resisted by a spring 88 having an adjusting screw 90 to vary the tension thereon. The aforesaid movement of the operating lever 78 also is resisted by a link 92 connected to a secondary operating lever 94 pivoted by a pin 96 on a supporting plate 98. The secondary operating lever 94 is pivotally attached to a piston rod 100 of a speed sensor 102, a fifth principal component of the system, to which control air is supplied through a line 104 from an air control line 105 supplying control air to an engine governor 106. The speed sensor 102 need only be used with variable speed engines.

As engine load increases and as more fuel flows through the lines 84 and 86, the operating lever 78 will move toward the left and the selector valve rod 74 will similarly move, as will be discussed in more detail subsequently. However, for variable speed engines, at higher speeds the speed sensor 102 will urge the piston rod 100 toward the right and thereby resist the clockwise movement of the operating arm 78 through the secondary operating lever 94 and the link 92.

As the selector valve rod 74 moves toward the left, the cylinder selector valve 60 supplies oil sequentially through more of the lines 64 to more of the control valves 34. When each of the control valves 34 receives oil pressure from the line 64 through its inlet 58, it supplies oil under pressure to the fuel valve 26 upon each reciprocatory movement of the push rod 46 so that fuel will be supplied to the associated cylinder 12 each time the associated piston 14 is in a predetermined position to provide a two-cycle operation. When the selector valve rod 74 is in its extreme left position, which will occur under full load with maximum fuel passing through the lines 84 and 86 and the load sensor 82, all of the cylinders will be operating in the usual two-cycle manner.

As the load and fuel consumption decrease, the operating lever 78 will move toward the right under the influence of the spring 88 and the selector valve 60 sequentially stops the flow of oil through the lines 64 to the control valves 34. When this source of oil pressure is cut off to any one of the control valves 34, it will function to supply oil under pressure to the fuel valve 26 only upon every other stroke of the associated push rod 46 so that fuel will be supplied to the associated cylinder 12 only upon every other stroke of the corresponding piston 14, thus establishing a "four-cycle" operation. When the selector valve rod 74 is in its extreme right position, oil flow through all of the lines 64 is stopped so that all of the cylinders will operate in a four-cycle manner.

To summarize the operation, the load sensor 82 and the speed sensor 102, when used, control the position of the rod 74 of the cylinder selector valve 60. This valve determines the number of the control valves 34 which receive oil. Those receiving oil then supply oil to the fuel valve 26 upon each stroke of their corresponding pistons 14 so that the respective cylinders 12 will be firing on a normal two-cycle basis. The greater the load, the farther the sensor 82 will move the rod 74 toward the left and more of the control valves 34 will receive oil from the selector valve 60. Hence, more of the fuel valves 26 will receive oil from the control valves 34 to supply fuel to the associated cylinders 12 upon each stroke of the pistons 14. Thus, as the load increases the number of cylinders 12 operating on a two-cycle basis also increases.

With the over-all fuel system and the operation thereof having been discussed, attention will now be directed to the individual components of the system which are shown in detail in FIGS. 3–12.

Fuel Valve 26

Referring to FIG. 3, the fuel control valve 26 is shown in vertical, longitudinal cross section. The fuel entering the line 28 passes through a cylindrical passage 108 to a fuel nozzle 110, the opening and closing of which is controlled by a valve member 112 integral with a valve rod 114. The valve rod 114 extends through a suitable seal 116 and contacts a piston 118 located in a cylinder 120, being urged against the lower end of the piston 118 by a spring 121. The cylinder 120 communicates with the inlet 30 through a passage 122.

An auxiliary passage 124, communicating with the passage 122, supplies part of the oil from the inlet 30 to a cylindrical valve chamber 126 containing a spool valve 128 which is part of the piston 118. As the piston 118 and the rod 114 move downwardly to open the nozzle 110 under the influence of the oil pressure from the line 30, the spool valve 128 also moves downwardly until the lower end thereof extends beyond the chamber 126 so that some of the oil from the auxiliary passage 124 can then flow through an outlet chamber 130 and an outlet passage 132 to the outlet line 32. The remaining oil flows back to the control valve 34 through the line 38 when a plunger in the valve 34 returns to its lowest position, as will be discussed subsequently. This feature provides several important advantages. It assures constant lift in all instances of the valve 112 because the pressure in the passage 122 drops immediately upon the opening of the spool valve 128. In addition, minute flow of oil through the inlet line 30, the passage 122, and the auxiliary passage 124 purges the hydraulic system of entrained air and foam and discharges enough oil upon each cycle that the make-up oil will prevent overheating of the hydraulic oil in the system.

An adjusting ring 134 and a cylinder body 136 can be moved in and out with respect to the piston 118 and the spool valve 128 to vary the position of the spool valve 128 with respect to the end of the chamber 126, thereby to control the degree of lift imparted to the fuel valve 112.

To review the operation of the fuel valve 26, when pressure is established in the inlet line 30 by means of the control valve 36, the piston 118 moves downwardly to lift the valve 112 from the nozzle 110 to enable fuel to be supplied through the line 28 and the passage 108 to the cylinder 12. The piston 118 moves downwardly until the lower end of the spool valve 128 projects from the chamber 126 to enable fuel in the line 30 and the passage 122 to escape through the chamber 130, the outlet passage 132, and the outlet line 32.

*Pressure Control Valve 34*

Oil will be supplied to the inlet 30 of the valve 26 upon every stroke or every other stroke of the piston 14 depending on the position of the control valve 34 which is shown in more detail in FIGS. 4–7. The valve 34 includes a lower spring chamber 138 in which is a push rod-receiving member 140 in pivotal contact with the upper end of the push rod 46. A plunger 142 is maintained in contact with the connecting member 140 by means of a spring 144 and a spring retainer 146 which urges an enlarged head 148 of the plunger 142 downwardly against the connecting member 140. The plunger 142 extends through a guide passage 150 with its operating end in an enlarged intake chamber 152 when the plunger 142 is at the bottom of its stroke. At upper portions of its stroke, the plunger 142 is received in a cylinder 154. The plunger 142 acts as a port suction pump and operates without an inlet valve. Accordingly, a vacuum is formed during the down stroke of the plunger 142 causing oil to be admitted through the inlet 40 and an inlet passage 156 to the enlarged chamber 152 and into the cylinder 154. This oil is discharged through a passage 158 to the outlet 36 and through the line 38 to the inlet 30 of the gas valve 26. The fuel valve 26 thereby is caused to open and supply gas through the line 28 to the cylinder 12. Thus, upon each reciprocatory motion of the pump plunger 142, the fuel valve 26 will open, when oil pressure is supplied from the selector valve 60 through the line 64 to the inlet 58 of the control valve 34, as will be understood more fully from the following discussion.

A plunger rod 160 is located above and in alignment with the plunger 142. The rod 160 extends through a plunger plate 162 and is connected to a plunger piston 164 in a cylinder 166 defined at the lower end by the plate 162 and at the upper end by a cap 168. A spring 170 in the cylinder 166 urges the rod piston 164 downwardly so as to maintain the plunger rod 160 in contact with the plunger 142, as shown. However, when oil is supplied from the selector valve 60 to the inlet 58, this oil enters a pressure inlet 171 (FIG. 7) and a longitudinal valve passage 172 (FIG. 5) forcing a spool valve 174, including a connecting rod 176 and three enlarged portions 178, 180, and 182 downwardly against the force of a spring 184 located in the bottom of the valve passage 172. This pressure forces the upper enlarged portion 178 of the spool valve 174 downwardly below a passage 186, thus enabling the oil to enter the space between the piston 164 and the plunger plate 162 to drive the piston 164 upwardly against the force of the spring 170. This moves the plunger rod 160 upwardly away from the plunger 142 and makes the operation of the fuel valve 26 solely dependent upon the movement of the plunger 142 in the manner discussed above, causing the fuel valve 26 to open every cycle.

Figure 6:
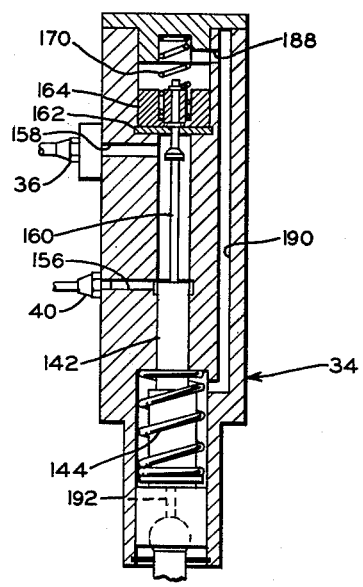
FIG. 6 is a view in cross section taken along the line 6—6 of FIG. 4.

As the piston 164 is forced upwardly, oil trapped above it drains directly through a drain port 188 to a drain manifold 190 (FIG. 6.) The oil then drains down the manifold 190 to the spring chamber 138 and through passages 192 in the connecting member 140. Oil in the space between the piston 164 and the plate 162 ordinarily will drain through the line 186, the valve passage 172, and a connecting drain line 194 to the drain manifold 190 but, with the spool valve 174 in its lowest position, the upper enlarged portion 178 thereof blocks off the connecting drain passage 194. Hence, oil under pressure remains between the plate 162 and the piston 164 as long as there is oil pressure in the inlet 58. The plunger rod 160 thus remains in its upper position, separated from the plunger 142, and the cylinder 12 operates on a two-cycle basis. During this time, the intermediate enlarged portion 180 curves a plunger drain passage 196 connecting the valve passage 172 and the drain manifold 190 to prevent the possibility of oil in the plunger chamber 154 from draining through the passage 196, as will be apparent subsequently.

When oil pressure in the inlet 58 drops significantly, the spring 184 in the valve passage 172 forces the valve spool 174 to its upper position, as shown, thus enabling the oil trapped between the plate 162 and the piston 164 to drain outwardly through the passage 186, the valve passage 172, the passage 194, and the drain manifold 190. The spring 170 can then force the piston 164 downwardly to cause the plunger rod 160 to contact the upper end of the plunger 142 until oil under pressure is again applied to the inlet 58.

While the plunger rod 160 is in the lower position, firing of the cylinder 12 will occur only upon every other down stroke of the piston 14. This is accomplished by means of a rachet sleeve 198 rotatably mounted on a sleeve support 200 and located so as to project into the plunger chamber 154 near the plunger rod 160. The sleeve 198 has ten steps or notches 202, in this instance, which are engaged by a ratchet strip 204 which is affixed to the plunger rod 160. The strip 204 engages one of the steps 202 upon each down stroke of the rod 160 and moves it counterclockwise one-tenth of a revolution so as to position the next step for engagement upon the next downward stroke of the plunger rod 160. A leaf spring 206, held by a supporting plug 208, engages one of the steps 202 after the plunger rod 160 has completed a downward stroke, to prevent the sleeve 198 from being dragged in the opposite or clockwise direction upon upward movement of the rod 160. A guide pin 210 is located on the side of the rod 160 opposite the sleeve 198 to serve as a guide and support for the rod 160.

Five radially-extending sleeve slots or passages 212 are located in the sleeve 198 and five radially-extending inner slots or passages 214 are located in the sleeve support 198, these passages communicating with a central bore or passage 216. The central passage connects to the valve passage 172 by means of a port 218 and, with the valve spool 174 in the upper position, further communicates with the drain manifold 190 by means of the connecting passage 196. With this arrangement, when the sleeve passages 212 are in alignment with the support passages 214, a drain connection is established between the plunger chamber 154 and the drain manifold 190 by means of the aligned passages 212 and 214, the central passage 216, the connecting port 218, the valve passage 172 between the lower enlarged portion 182 and the intermediate enlarged portion 180, and the connecting port 196. When the radial passages 212 and 214 are in alignment, it is impossible for pressure to build up in the plunger chamber 154 because oil therein drains through the drain manifold and, hence, the fuel valve 26 will remain closed whenever it does not receive pressure, as in the instance when the passages 212 and 214 are aligned. Because there are twice as many of the steps 202 as there are passages 212 and 214 the passages will be in alignment only upon every other down stroke of the plunger rod 160 so that the fuel valve 26 does not receive any pressure during every other reciprocatory movement of the plunger rod 160.

It will be understood that when the plunger rod 160 is moved from its lower position to its upper, inoperative position when oil is supplied under pressure through the inlet 58, the radial passages 212 and 214 might remain either in alignment or out of alignment. However, as previously pointed out, when oil is supplied to the inlet 58, it forces the spool valve 174 downwardly so that the intermediate enlarged portion 180 covers the connecting drain port 196 to prevent oil draining from the plunger chamber 154 regardless of the positions of the passages 212 and 214.

The oil draining from the outlet 32 of the fuel valve 26 flows through a drain line 220 to a drain inlet 222 in the control valve 34, which inlet connects with the drain manifold 190 by means of a passage 224 (FIG. 7).

*Cylinder Selector Valve 60*

Figure 8:
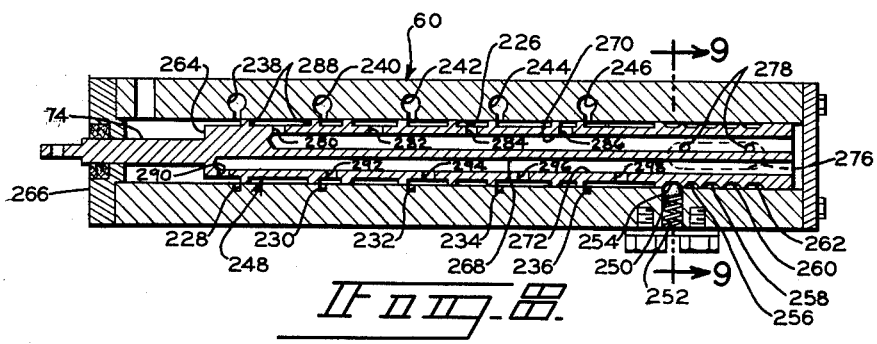
FIG. 8 is a detailed view in vertical cross section of a cylinder selector valve shown in FIGS. 1 and 2.
Figure 9:
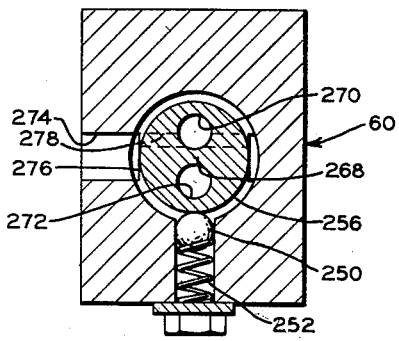
FIG. 9 is a view in cross section taken along the line 9—9 of FIG. 8.

Referring more particularly to FIGS. 8 and 9, the cylinder selector valve 60, which controls oil to the five control valves 34, will be described in detail. The selector valve 60 includes a central cylindrical chamber 226 in which is milled five annular grooves 228—236 which communicate with the outlet connections 62 and the lines 64 for the five control valves 34 through five outlet passages 238—246. Within the chamber 226 is a cylindrical control member 248 to which is connected the operating arm 74. The member 248 has six positions, the first five of which are determined by a detent comprising a ball 250 and a spring 252 cooperating with five annular detent grooves 254—262, and the sixth of which is determined by a shoulder 264 bearing against an end plate 266 when the ball 250 is positioned just beyond the last annular groove 262.

The member 248 is divided by a partition 268 into an upper, supply passage 270, and a lower, drain passage 272. Oil is supplied to the upper passage 270 from the line 66 through an inlet passage 274 (FIG. 9), a slot 276, and two inlet ports 278. The supply passage 270 contains four spaced supply ports 280—286 through which oil is supplied to the outlet passages 238—244 in a sequential manner, when the ports 280—286 are properly aligned therewith. The oil supply for the last outlet passage 246 is supplied from the inlet passage 274 by means of the slot 276 which connects the inlet 274 with the outlet passage 246 by means of the first detent groove 254, when the member 248 is in its extreme left-hand position.

The member 248 has appropriately spaced annular ridges 288 positioned on each side of each of the supply ports 280—286 to prevent the individual supply ports from supplying oil to more than one of the outlet passages 238—246 and also to isolate the supply ports 280—286 and the slot 276 from five drain ports 290—298 which remain in communication with the inlet passages 238—246 by means of the annular grooves 228—236 until the supply ports 280—286 and the slot 276 communicate with their appropriate connecting inlet lines. Thus, as the member 248 moves one detent groove toward the left, oil will be supplied through the passage 270 to an additional one of the outlet passages 238—246 and at the same time the drain port for that particular outlet passage will be shut off therefrom. When the member 248 reaches its extreme left position with the shoulder 264 against the end plate 266, oil will be supplied to all five of the connecting outlet passages 238—246 and oil will be supplied through all five of the lines 64 to all five of the control valves 26. All five of the cylinders 12 will then fire on every down stroke of the pistons 14.

*Load Sensor 82*

The position of the member 248 in the selector valve 60 is determined by the position of the operating lever 78 which is determined in part by the amount of gas flowing through the load sensor 82. Referring more particularly to FIG. 10, the load sensor 82 is shown in cross section and includes a housing 300 having a fuel inlet 302 and a fuel outlet 304. A tapered flow-sensitive valve member 306 is located in an orifice 308 and has a rod 310 extending rearwardly to a circular guide body 312 slidably mounted in a cylindrical guide 314. An intermediate portion of the rod 310 has a pair of flanges 316 between which is located a pivot ball 318 of a connecting arm 320 affixed to the shaft 80. As the load on the engine 10 increases, and more fuel is passed through the load sensor 82, it pushes the tapered valve member 306 toward the left and moves the connecting arm 320 in the same direction. This causes the shaft 80 to move in a clockwise direction and the operating lever 78 to move similarly, overcoming the force of the spring 88. The selector valve arm 74 is then moved toward the left, similarly moving the selector valve member 248 toward the left at least to the adjacent one of the detent grooves 254—262. The selector valve 60 then supplies oil to more of the control valves 34 to cause their associated fuel valves 26 to fire upon every cycle, rather than upon every other one.

A substantial force can be established by the load sensor 82. In a particular instance, at maximum flow, the pressure differential across the valve member 306 is five p.s.i. which provides a force at the end of the operating arm 78 of approximately 35 pounds. At one-quarter load, the differential pressure across the valve 306 is approximately one p.s.i., providing a force at the end of the operating lever 78 of about seven pounds.

With constant speed, the fuel flow is in proportion to the cylinder torque and the load sensor 82 provides adequate control. However, when the speed of the engine is varied, the gas flow is no longer proportional and additional speed sensing means must be employed. One common method of varying engine speed is by varying pneumatic pressure applied to the engine governor. With this arrangement, the speed sensor 102 is connected to the pneumatic governor control line 105 and modifies the setting of the load sensor 82 so that the proper fuel charges are injected to maintain the torque on each firing cylinder between approximately 50% and maximum cylinder B.M.E.P.

*Speed Sensor 102*

When the governor control pressure is increased to cause increase in the engine speed, the speed sensor is connected as shown in FIGS. 2 and 11. The speed sensor 102 includes two housing sections 322 and 324 held together by bolts 326 and between which is a diaphragm 328. The line 104 is connected with an access opening 330 to provide pressure in a chamber 332 on the blind side of the diaphragm 328. The diaphragm rod 100 is suitably attached to the diaphragm and extends through the housing section 322 and connects with the secondary operating lever 94 by means of a pivot pin 334. When the governor control pressure in the line 105 is increased to increase engine speed, this pressure is also transmitted through the line 104 to the chamber 332 to urge the diaphragm rod 100 toward the right and thereby tend to overcome the tendency of the main operating lever 78 to move toward the left, in a clockwise direction, under the influence of the load sensor 82. Thus, the selector valve rod 74 will move less toward the left than it would without the influence of the speed sensor 102 so that fewer of the control valves 34 will receive oil under pressure through the lines 64 and fewer of the cylinders 12 will fire upon each stroke of the pistons 14.

In the instance where governor control pressure is decreased to increase engine speed, the speed sensor 102 is arranged as shown in FIG. 12. In this instance, the diaphragm rod 100 is connected to an elongate link 336 through a pivot tube 338 and a bolt 340. The opposite end of the elongate link 336 is similarly pivotally connected to the secondary operating lever 94 by means of a pivot tube 342 and a bolt 344. Thus, when the governor control pressure is decreased, the diaphragm rod 100 moves toward the right, thereby moving the link 336 and the secondary operating lever 94 toward the right to resist the movement of the operating lever 78 toward the left so that, again, fewer of the cylinders 12 will operate on the normal two-cycle basis than would otherwise occur without the speed sensor 102.

*Operation*

While the operation of the fuel system has been discussed above in connection with the over-all system and the components thereof, a summary of the operation will be set forth to better enable an understanding of the invention. With the engine 10 operating under light load conditions, relatively little fuel will be called for and relatively little will flow through the lines 84 and 86 (FIGS. 1 and 2) and the load sensor 82. Hence, the main operating lever 78 will remain in its right-hand or extreme counterclockwise position and the cylinder selector rod 74 will likewise remain in its extreme right position under the influence of the adjusting spring 88. No oil in the line 66 from the booster and regulator 68 is then supplied through the selector valve 60 to the lines 64. Without any pressure in the lines 64, there is no pressure between the plate 162 (FIGS. 4–6) and the piston of each of the control valves 34 so that the plunger rod 160 will ride on the top of the plunger 142 and move upwardly and downwardly therewith, along with the push rod 46.

The strip 204 of the rod 160 then moves the ratchet shell 198 one-tenth of a revolution upon each cycle of the rod 160 and causes the radial openings 212 and 214 to be aligned upon every other stroke of the rod 160. When this alignment is effected, a discharge path is established from the plunger chamber 154 to the discharge opening 196 so that no pressure can build up in the chamber 154 when the passages 212 and 214 are aligned. Hence, no pressure can be supplied through the outlet 36 to the fuel valve 26 and the valve 26 will not open. Thus, upon every other downward stroke of the plunger rod 160, the associated fuel valve 26 will not open and the cylinder 12 will not fire. All cylinders will then be operating on a "four-cycle" basis when the rod 74 of the selector valve 60 is in its extreme right position.

As the load increases and fuel consumption likewise increases, the load sensitive member 306 of the load sensor 82 will move toward the left and thereby move the main operating lever 78 toward the left, subject to the resistant force of the spring 88 and another resistant force of the diaphragm rod 100 of the speed sensor 102. As the main operating lever 78 moves toward the left, the selector valve rod 74 similarly moves and sequentially aligns the various supply ports 280—286 with the outlet passages 238—246 through which oil under pressure is supplied through the connections 62 and the lines 64 to the control valves 34. As the supply ports 280—286 and the slot 276 move into register with the connecting passages 238—246, the drain ports 290—298 move out of register with the annular grooves 228—236 communicating with the passages 238—246 to enable pressure to be built up therein.

As each of the control valves 34 receives oil under pressure from the associated line 64, this oil forces the spool valve 174 (FIG. 5) downwardly and oil is supplied through the passage 186 to the space between the plate 162 and the piston 164, as the upper enlarged portion 178 of the valve 174 moves below the port 186. The piston 164 then moves upwardly and separates the plunger rod 160 from the plunger 142, thereby stopping reciprocatory movement of the rod 160 and rotary movement of the ratchet shell 198. The intermediate enlarged portion 180 of the spool valve 174 also closes off the drain line 196 to prevent the loss of oil from the plunger chamber 154 regardless of the position of the shell 198 with respect to the ratchet support 200. Thus, pressure is established in the chamber 154 upon each upward stroke of the plunger 142, as controlled by the push rod 46 and the cam 48. This oil is supplied through the line 38 to the fuel valve 26, thereby causing the valve to open and admit fuel through the line 28 to the cylinder 12 upon each downward stroke of the piston 14. When the selector valve rod 74 of the valve 60 reaches its extreme left position, all of the control valves 34 receive oil and all of the cylinders 12 fire on the conventional two-cycle basis.

Various modifications of the above described preferred embodiment of the invention will be apparent to those skilled in the art. It is to be understood that such modifications can be made without departing from the scope of the invention, if they are within the scope and spirit of the accompanying claims.

I claim:

1. In an internal combustion engine having a plurality of cylinders in which fuel is burned, a piston for each cylinder, a crankshaft to which the pistons are rotatably connected, a fuel line for each cylinder to supply fuel thereto, a fuel valve in each of said fuel lines for controlling the flow of fuel therethrough, the improvement comprising a fuel control system for reducing fuel consumption when the engine is operating at less than full load, said system including control valve means for each of said fuel valves for opening said fuel valves, said control valve means including push rod means synchronized with movement of its corresponding piston, means having a first position responsive to said push rod means and a second position independent of said push rod means, means for opening the fuel valve when said two-position means is in the second position and the piston is in a predetermined position, and means responsive to fuel flow to said cylinders for moving said two-position means from its first position to its second position when the fuel flow exceeds a predetermined amount.

2. A gas-fired engine and fuel control system therefor comprising, in combination, a plurality of cylinders in which fuel is consumed, a piston for each cylinder, a crankshaft to which the pistons are rotatably connected, a fuel line for each cylinder to supply fuel thereto, a fuel valve in each of the fuel lines for controlling the flow of fuel therethrough, a control valve connected to each of the fuel valves, reciprocating rod means for each of the pistons, each being responsive to the position of the corresponding piston, first means in said control valve responsive to the position of said rod means, second means associated with each of said control valves and having a first position responsive to the position of said first means and a second position independent of the position of said first means, said second means causing said fuel valve to open every other time the corresponding piston is in a predetermined position when said second means is in its first position and causing said fuel valve to open every time the corresponding piston is in its predetermined position when said second means is in its second position, and means for moving said second means from its first to its second position when a factor of engine performance exceeds a predetermined amount.

3. The combination according to claim 2 wherein the engine factor to which said moving means is responsive is fuel consumption.

4. The combination according to claim 2 when the engine factor to which said moving means is responsive is a combination of fuel consumption and engine speed.

5. A gas-fired engine and fuel system therefor comprising, in combination, a plurality of cylinders in which fuel is burned, a piston for each of said cylinders, a crankshaft to which said pistons are rotatably connected, a fuel line for each of said cylinders to supply fuel thereto, a fuel valve in each of said fuel lines for controlling the flow of fuel therethrough, a control valve for each of said fuel valves, a push rod for each of said control valves, means for operating each of said push rods in response to their corresponding pistons, each of said control valves including plunger means driven in a reciprocatory manner by its corresponding push rod and two-position means having a first position responsive to the position of said plunger means and a second position independent of the position of said plunger means, said two-position means when in its first position causing said control valve to open every other time the associated piston is in a predetermined position, and said two-position means when in its second position causing said fuel valve to open every time the associated piston is in the predetermined position, cylinder selector means for sequentially causing movement of said two-position means of said control valves between their first and second positions, and means connected to said cylinder selector valve for causing the sequential movement.

6. The combination according to claim 5 wherein said last-named means is responsive to fuel consumption of the engine.

7. The combination according to claim 5 wherein said last-named means is responsive to fuel consumption and speed of the engine.

8. The combination according to claim 5 wherein said last-named means is responsive to an engine performance factor which varies according to the load on the engine.

9. A gas-fired engine and fuel system therefor comprising, in combination, a plurality of cylinders in which fuel is burned, a piston for each of said cylinders, a crankshaft to which said pistons are rotatably connected, a fuel line for each of said cylinders to supply fuel thereto, a fuel valve in each of said fuel lines for controlling the flow of fuel therethrough, a control valve for opening and closing each of said fuel valves, each of said control valves including a plunger cylinder and a plunger, means for operating said plunger in response to its associated piston, means for supplying oil to said plunger cylinder, means for establishing fluid communication between said plunger cylinder and the associated fuel valve, drain means for said plunger cylinder, and means having a first position responsive to the position of said plunger means and a second position independent of the position of said plunger means, said two-position means when in its first position causing said drain means to open once every other cycle of the plunger, and said two-position means when in its second position causing said drain means to remain closed during all cycles of the plunger, and selector means for causing movement of the two-position means between the first and the second positions thereof.

10. A gas-fired engine and fuel system therefor comprising, in combination, a plurality of cylinders in which fuel is burned, a piston for each of said cylinders, a crankshaft to which said pistons are rotatably connected, a fuel line for each of said cylinders to supply fuel thereto, a fuel valve in each of said fuel lines for controlling the flow of fuel therethrough, a control valve for opening and closing each of said fuel valves, each of said control valves having plunger means, means for reciprocating said plunger means in said control valves in response to the position of the corresponding piston, a plunger cylinder associated with said plunger means, a fluid inlet for said plunger cylinder, a fluid outlet for said plunger cylinder, drain means for draining fluid from said plunger cylinder, when said drain means is open, a plunger rod having a first position in contact with said plunger means and a second position out of contact with said plunger means, means operated by said plunger rod for opening said drain means upon every other cycle of said plunger means when said plunger rod is in its first position, means carried by said control valve for closing said drain means when fluid under pressure is applied thereto, and selector valve means for supplying fluid under pressure to each of said control valves for moving said plunger rod from said first position to said second position and for operating said drain-closing means to close off said drain means for all cycles of said plunger means.

References Cited in the file of this patent

UNITED STATES PATENTS

| | | |
|---|---|---|
| 1,792,028 | Peterson | Feb. 10, 1931 |
| 2,232,841 | Dickson | Feb. 25, 1941 |
| 2,444,440 | Grieshaber et al. | July 6, 1948 |
| 2,771,867 | Peras | Nov. 27, 1956 |

FOREIGN PATENTS

| | | |
|---|---|---|
| 675,728 | France | Nov. 8, 1929 |